(12) United States Patent
Yeon et al.

(10) Patent No.: US 9,932,242 B2
(45) Date of Patent: Apr. 3, 2018

(54) METHOD FOR MANUFACTURING CATHODE ACTIVE MATERIAL FOR LITHIUM SECONDARY BATTERY

(71) Applicant: SK Innovation Co., Ltd., Seoul (KR)

(72) Inventors: Jung In Yeon, Daejeon (KR); Kook Hyun Han, Daejeon (KR); Min Gu Kang, Seoul (KR); Seong Ho Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 144 days.

(21) Appl. No.: 14/362,877

(22) PCT Filed: Dec. 6, 2012

(86) PCT No.: PCT/KR2012/010544
§ 371 (c)(1),
(2) Date: Jun. 4, 2014

(87) PCT Pub. No.: WO2013/085306
PCT Pub. Date: Jun. 13, 2013

(65) Prior Publication Data
US 2014/0346392 A1 Nov. 27, 2014

(30) Foreign Application Priority Data
Dec. 6, 2011 (KR) .................. 10-2011-0129598

(51) Int. Cl.
*C01G 53/00* (2006.01)
*H01M 4/505* (2010.01)
*H01M 4/525* (2010.01)
*C01G 45/12* (2006.01)
*H01M 10/052* (2010.01)

(52) U.S. Cl.
CPC .......... *C01G 53/50* (2013.01); *C01G 45/1228* (2013.01); *C01G 45/1242* (2013.01); *H01M 4/505* (2013.01); *H01M 4/525* (2013.01); *H01M 10/052* (2013.01)

(58) Field of Classification Search
None
See application file for complete search history.

(56) References Cited

U.S. PATENT DOCUMENTS

| 5,565,688 A * | 10/1996 | Hayashi | C01B 13/185 |
| | | | 252/182.1 |
| 5,742,070 A * | 4/1998 | Hayashi | C01B 13/185 |
| | | | 252/182.1 |
| 2009/0220859 A1 | 9/2009 | Yoon et al. | |
| 2012/0180307 A1 * | 7/2012 | Lai | H01B 1/08 |
| | | | 29/623.1 |
| 2012/0326078 A1 * | 12/2012 | Chung | H01M 4/0471 |
| | | | 252/182.1 |

FOREIGN PATENT DOCUMENTS

| CN | 102496708 A * | 6/2012 |
| JP | 7142065 A | 6/1995 |
| JP | 950811 A | 2/1997 |
| KR | 1020090108964 A | 10/2009 |
| KR | 1020100060362 A | 6/2010 |
| KR | 1020100099594 A | 9/2010 |
| KR | 1020110039657 A | 4/2011 |
| KR | 1020110061204 A | 6/2011 |

OTHER PUBLICATIONS

Julien C et al: "Layered LiNi0.5Co0.5O2 cathode materials grown by soft-chemistry via various solution methods" Materials Science and Engineering B, 2000, pp. 145-155, vol. 76, No. 2,Elsevier Sepuoia Lausanne, Ch.
Nam K W et al: "In situ X-ray diffraction studies of mixed LiMn2O4-LiNi1/3Co1/3Mn1/3O2 composite cathode in Li-ion cells during charge-discharge cycling", Journal of Power Sources, 2009, pp. 652-659, vol. 192, No. 2, Elsevier SA, Ch.

* cited by examiner

*Primary Examiner* — Tanisha Diggs
(74) *Attorney, Agent, or Firm* — The Webb Law Firm

(57) ABSTRACT

Provided is a method for manufacturing a cathode active material for a lithium secondary battery, the method including heat-treating a precursor aqueous solution containing a lithium precursor, a transition metal precursor, and an organic acid containing a carboxyl group, and having a chelation index (C.I) value less than 1 and 0.5 or more, wherein the chelation index value is defined by transmittance of a peak located in a wavenumber from 1,700 to 1,710 $cm^{-1}$ and transmittance of a peak located in a wavenumber from 1,550 to 1,610 $cm^{-1}$ in Fourier transform infrared (FTIR) spectroscopy spectrum.

11 Claims, 2 Drawing Sheets

[FIG. 1]
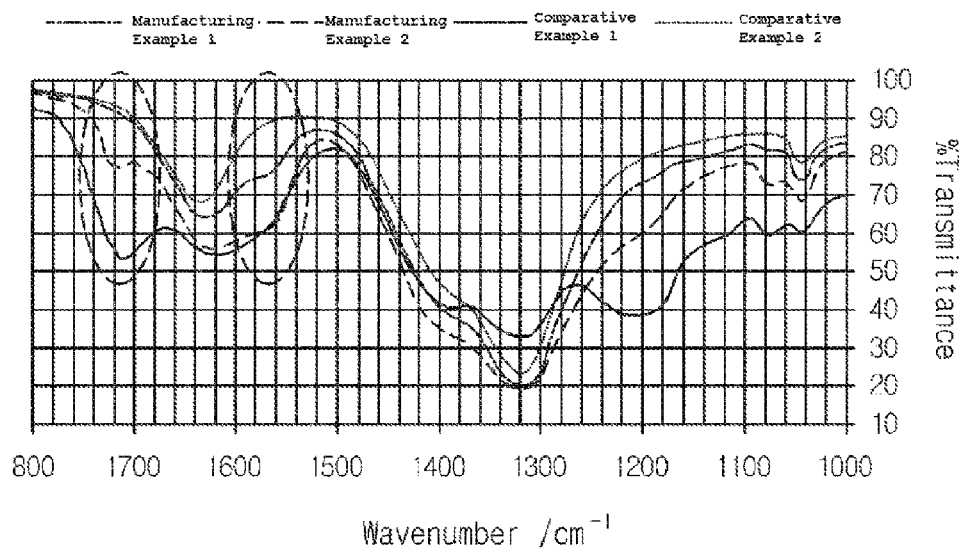
[FIG. 2]
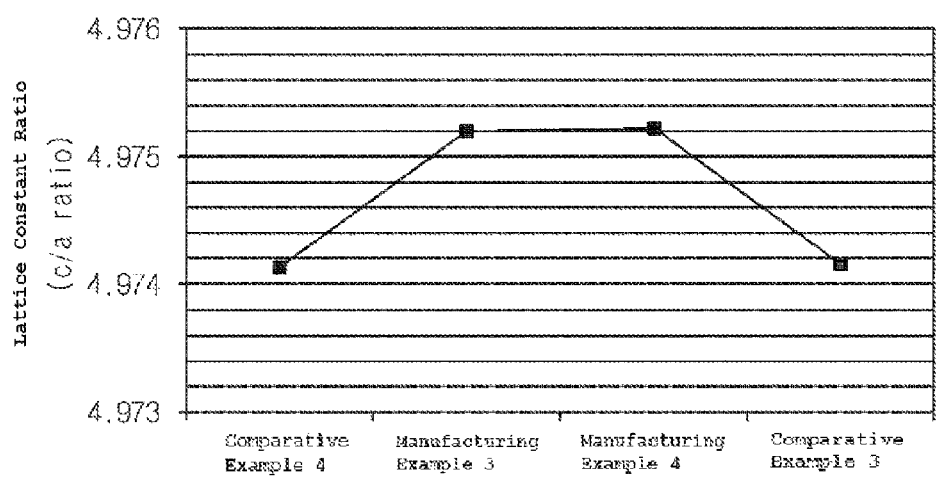

[FIG. 3]
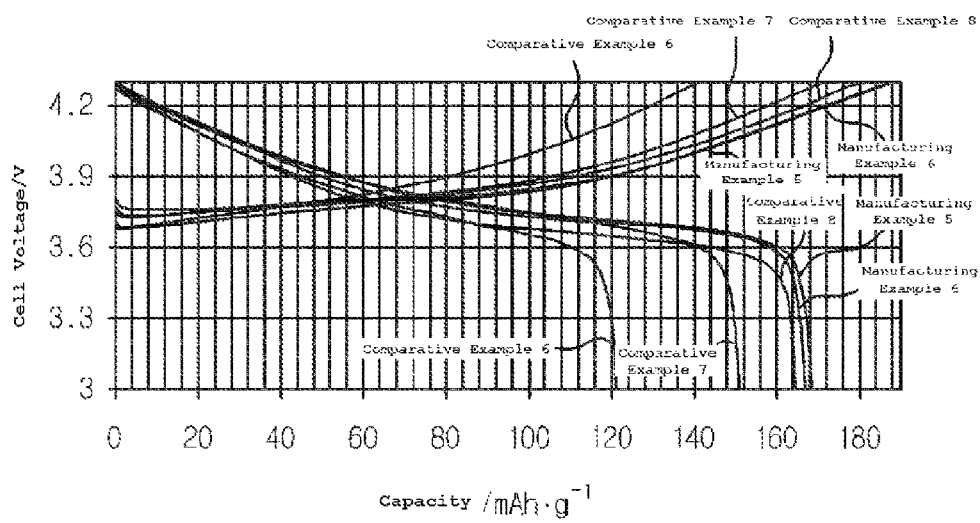
[FIG. 4]
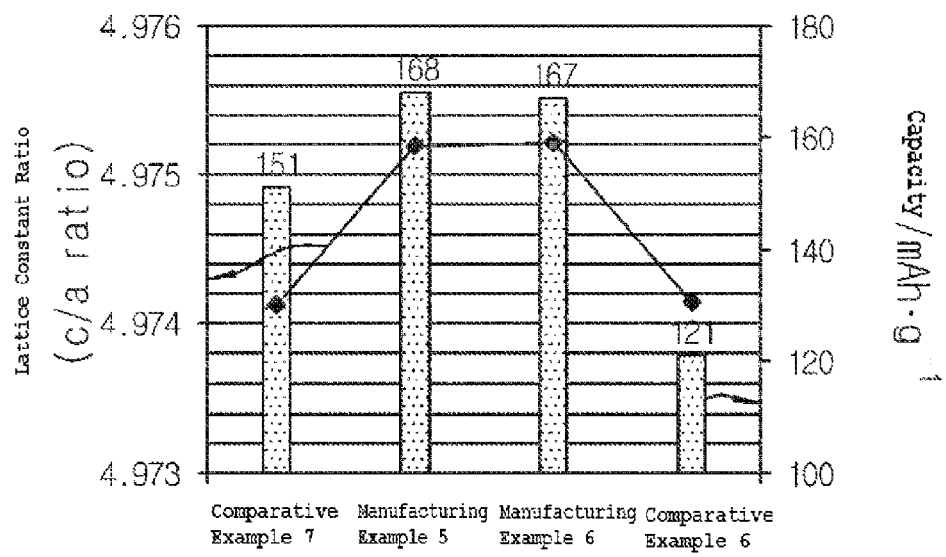

“METHOD FOR MANUFACTURING CATHODE ACTIVE MATERIAL FOR LITHIUM SECONDARY BATTERY”

CROSS-REFERENCE TO RELATED APPLICATIONS

This application is the United States national phase of International Application No. PCT/KR2012/01054 filed Dec. 6, 2012, and claims priority to Korean Patent Application No. 10-2011-0129598 filed Dec. 6, 2011, the disclosures of which are hereby incorporated in their entirety by reference.

TECHNICAL FIELD

The present invention relates to a method for manufacturing a cathode active material for a lithium secondary battery, and more particularly, to a method for manufacturing a cathode active material capable of having uniform composition and easily inserting lithium ions thereinto and easily desorbing lithium ions therefrom.

BACKGROUND ART

A battery is largely classified into primary and secondary batteries, wherein the primary battery, which is a battery of producing electricity by a non-reversible reaction to be non-reusable after the battery is used once, includes a dry battery generally used, a mercury battery, a Volta's battery, and the like, by way of an example; meanwhile, the secondary battery, which is a battery of using a reversible reaction to be reusable by charging after being used, unlike the primary battery, includes a lead storage battery, a lithium ion battery, a nickel-cadmium (Ni—Cd) battery, and the like, by way of an example.

The lithium ion battery, which is one of the secondary battery, is configured to include an anode generally consisting of carbon, a cathode generally consisting of lithium compounds, an electrolyte disposed between the anode and the cathode, and a wire connecting the anode and the cathode. Lithium ions in the electrolyte moves toward the anode at the time of charging, and moves toward the cathode at the time of discharging, and generate a chemical reaction while discharging surplus electrons from each pole or absorbing surplus electrons thereinto. During this process, electrons flow in the wire, and thus, an electric energy is generated.

Life, energy density, and thermal stability of the lithium secondary battery are mainly determined by the cathode active material. It is known that physical properties of the cathode active material are largely affected by composition of the active material and a method for manufacturing the same.

As a general method for manufacturing the cathode active material, Korean Patent Laid-Open Publication No. 2009-0108964 discloses a solid phase reaction method and Korean Patent Laid-Open Publication No. 2011-0039657 discloses a coprecipitation method. The solid phase reaction method is a method for manufacturing a cathode active material by using carbonate or hydroxide of each element constituting the cathode active material and repeating mixing and heat-treating processes several times, and the coprecipitation method is a method for manufacturing a cathode active material by mixing a precursor with a lithium source, and then performing a heat-treatment, wherein the precursor is prepared by mixing each element constituting the cathode active material except for lithium in a solution, followed by coprecipitation.

However, in the solid phase method, there is a risk in that impurities flow in mixing solid phase raw materials, and since the cathode active materials are manufactured by solid phase diffusion, there is a difficulty in manufacturing a phase having uniform composition and in adjusting a size of final particles, and at the time of manufacturing, energy and time are significantly consumed. In the coprecipitation method, precise control in processes is required to obtain uniform precipitation, pollution caused by additives for precipitation is inevitable, a large amount of waste liquid occurs. In addition, as compared to the solid phase method, the active material manufactured by the coprecipitation method has uniform composition; however, there is still compositional non-uniformity.

Therefore, development of a method for manufacturing a cathode active material having significantly excellent compositional uniformity and high capacity, being free of pollution, and being manufactured by mass-production with a simple process, a short-time, and a low cost, in an environment-friendly manner in which by-products such as waste liquid do not occur, has been urgently demanded.

DISCLOSURE

Technical Problem

An object of the present invention is to provide a precursor aqueous solution capable of manufacturing a cathode active material having excellent compositional uniformity and easily inserting lithium ions thereinto and easily desorbing lithium ions therefrom at the time of manufacturing the cathode active material for a lithium secondary battery, and a method for manufacturing the cathode active material for a lithium secondary battery using the same.

Technical Solution

In one general aspect, the present invention provides a method for manufacturing a cathode active material for a lithium secondary battery, including: heat-treating a precursor aqueous solution containing a lithium precursor, a transition metal precursor, and an organic acid containing a carboxyl group, and having Fourier transform infrared (FTIR) spectroscopy spectrum satisfying the following Equation 2 by the definition of the following Equation 1:

$$\text{Chelation Index (C.I.)} = \frac{100 - \% \text{ Transmittance}(1550)}{(100 - \% \text{ Transmittance}(1550)) + (100 - \% \text{ transmittance}(1700))} \quad \text{(Equation 1)}$$

$$0.5 \leq \text{C.I.} < 1 \quad \text{(Equation 2)}$$

(in Equation 1 above, % Transmittance (1700) means transmittance of a peak located at a wavenumber from 1,700 to 1,710 $cm^{-1}$ in FTIR spectrum of a precursor gel obtained by preparing the precursor aqueous solution as a gel, and % Transmittance (1550) means transmittance of a peak located at a wavenumber from 1,550 to 1,610 $cm^{-1}$ in the same FTIR spectrum).

The transition metal precursor may be a precursor of one or two or more metals selected from a group consisting of nickel, cobalt, manganese, aluminum, magnesium, chromium, iron, zirconium, titanium, zinc, scandium, yttrium, niobium, molybdenum and ruthenium.

The lithium precursor and the transition metal precursor may be each independently nitrates, acetates, hydroxides, chlorides, sulfur oxides, or mixtures thereof.

The precursor aqueous solution may contain the lithium precursor and the transition metal precursor so as to satisfy the following Equation 3 or 4:

$$Li_{1+x}Ni_\alpha Mn_\beta Co_\gamma M'_\delta O_2 \quad \text{(Equation 3)}$$

(in Equation 3 above, x is an actual number satisfying $-0.04 \leq x < 1$, $\alpha$, $\beta$, $\gamma$, and $\delta$ are actual numbers satisfying $\alpha+\beta+\gamma+\delta=1$ and $0 \leq \alpha < 1$, $0 \leq \beta < 1$, $0 \leq \gamma < 1$, and $0 \leq \delta < 1$, and M' is one or more metals selected from aluminum, magnesium, chromium, iron, zirconium, titanium, zinc, scandium, yttrium, niobium, molybdenum and ruthenium)

$$LiMn_{2-y}M''_y O_4 \quad \text{(Equation 4)}$$

(in Equation 4 above, y is an actual number satisfying $0 \leq y < 2$ and M'' is one or more metals selected from nickel, cobalt, aluminum, magnesium, chromium, iron, zirconium, titanium, zinc, scandium, yttrium, niobium, molybdenum and ruthenium).

The precursor aqueous solution may have a molar concentration of lithium ions of 0.1M to 7.0M.

The method may further include: preparing the precursor aqueous solution as a gel.

The heat-treating may be a spray pyrolysis process.

In another general aspect, the present invention provides a cathode active material for a lithium secondary battery satisfying the following Equation 3 or the following Equation 4, and having a hexagonal compact structure in which a lattice constant ratio (c/a) is 4.975 or more:

$$Li_{1+x}Ni_\alpha Mn_\beta Co_\gamma M'_\delta O_2 \quad \text{(Equation 3)}$$

(in Equation 3 above, x is an actual number satisfying $-0.04 \leq x < 1$, $\alpha$, $\beta$, $\gamma$, and $\delta$ are actual numbers satisfying $\alpha+\beta+\gamma+\delta=1$ and $0 \leq \alpha < 1$, $0 \leq \beta < 1$, $0 \leq \gamma < 1$, and $0 \leq \delta < 1$, and M' is one or more metals selected from aluminum, magnesium, chromium, iron, zirconium, titanium, zinc, scandium, yttrium, niobium, molybdenum and ruthenium)

$$LiMn_{2-y}M''_y O_4 \quad \text{(Equation 4)}$$

(in Equation 4 above, y is an actual number satisfying $0 \leq y < 2$ and M'' is one or more metals selected from nickel, cobalt, aluminum, magnesium, chromium, iron, zirconium, titanium, zinc, scandium, yttrium, niobium, molybdenum and ruthenium).

Advantageous Effects

The precursor aqueous solution according to the present invention uses an organic acid containing a carboxylic group which is a chelating agent, such that the lithium and the transition metal are mixed with each other in a water-based solution, and the Equation 2 above is satisfied according to the Equation 1 above, such that the lithium and the transition metal may have uniformity maintained even at the time of water evaporation, decomposition and removal of organic materials, and nucleation and growth of the active material, thereby manufacturing the cathode active material having excellent crystallinity and significant uniform composition, and easily inserting lithium ions thereinto and easily desorbing lithium ions therefrom.

DESCRIPTION OF DRAWINGS

FIG. 1 shows results obtained by measuring precursor gels manufactured in Manufacturing Examples 1 and 2, and Comparative Examples 1 and 2, by Fourier transform infrared (FTIR) spectroscopy;

FIG. 2 shows results obtained by measuring each lattice constant ratio (c/a) of cathode active materials manufactured in Manufacturing Examples 3 and 4, and Comparative Examples 3 and 4;

FIG. 3 shows charge and discharge properties of each unit cell manufactured in Manufacturing Examples 5 and Comparative Examples 6, 7, and 8; and FIG. 4 shows relationships between capacity and lattice constant ratio of each unit cell manufactured in Manufacturing Examples 5 and 6 and Comparative Examples 6 and 7.

BEST MODE

Hereinafter, a method for manufacturing a cathode active material according to the present invention will be described. Here, unless technical and scientific terms used herein are defined otherwise, they have meanings understood by those skilled in the art to which the present invention pertains. Known functions and components which obscure the description and the accompanying drawings of the present invention with unnecessary detail will be omitted.

As a result of research on a cathode active material for a lithium secondary battery, the present inventors found that at the time of manufacturing the cathode active material, a cathode active material having uniformity and excellent capacity is manufactured by mixing lithium with transition metal in a precursor aqueous solution and at the time of preparing the precursor aqueous solution as a gel, adding a chelating agent into the aqueous solution so as to satisfy specific conditions, thereby completing the present invention.

The method for manufacturing a cathode active material for a lithium secondary battery, according to an exemplary embodiment of the present invention includes: heat-treating a precursor aqueous solution containing a lithium precursor, a transition metal precursor, and an organic acid containing a carboxyl group, and having Fourier transform infrared (FTIR) spectroscopy spectrum satisfying the following Equation 2 by the definition of the following Equation 1:

$$\text{Chelation Index (C.I.)} = \frac{100 - \% \text{ Transmittance}(1550)}{(100 - \% \text{ Transmittance}(1550) + (100 - \% \text{ transmittance}(1700))} \quad \text{(Equation 1)}$$

$$0.5 \leq \text{C.I.} < 1 \quad \text{(Equation 2)}$$

(in Equation 1 above, % Transmittance (1700) means transmittance of a peak located at a wavenumber from 1,700 to 1,710 cm$^{-1}$ in FTIR spectrum of a precursor gel obtained by preparing the precursor aqueous solution as a gel, and % Transmittance (1550) means transmittance of a peak located at a wavenumber from 1,550 to 1,610 cm$^{-1}$ in the same FTIR spectrum).

In detail, the precursor gel which is a measurement target of FTIR spectrum may include a gel obtained by reacting the precursor aqueous solution containing a lithium precursor, a transition metal precursor, and an organic acid containing a carboxyl group under a pressure of 153 mbar and at a temperature of 75° C. for 2 hours, by a vacuum evaporator.

In detail, the FTIR spectrum of the precursor gel may include a FTIR spectrum obtained under resolution measurement condition of 4 cm$^{-1}$ in 500-4000 cm$^{-1}$ region which is a Mid-IR region.

More specifically, the FTIR spectrum may include a spectrum having a wavenumber of an infrared light to be irradiated as one axis and transmittance according to a wavenumber of light as the other axis, wherein when light to be irradiated, having a specific wavenumber is all transmitted, transmittance of the other axis may include % transmittance having 100% of transmittance, and a peak on the FTIR spectrum may include a peak toward a direction in which transmittance is reduced.

In detail, the peak at located from 1700 to 1710 cm$^{-1}$ may include a peak according to a carboxylic group, and the peak at located from 1550 to 1610 cm$^{-1}$ may include a peak according to a carboxylate formed by chelation with metal ions.

The method for manufacturing the cathode active material according to an exemplary embodiment of the present invention uses the precursor aqueous solution containing a lithium precursor, a transition metal precursor, and an organic acid containing a carboxyl group, and satisfying the Equation 2 by the definition of the Equation 1, such that lithium and a transition metal are uniformly chelated, thereby manufacturing the cathode active material in which the lithium and the transition metal are significantly and uniformly coupled to each other and lithium ions are easily inserted into the cathode active material and easily desorbed from the cathode active material.

In detail, the precursor aqueous solution satisfies the Equation 2 by the definition of Equation 1, such that the cathode active material being uniform and having excellent crystallinity and excellent charge and discharge properties may be manufactured by a heat-treatment of the precursor aqueous solution.

In the method for manufacturing the cathode active material according to an exemplary embodiment of the present invention, an organic acid containing a carboxylic group which is a chelating agent is used, such that the lithium and the transition metal are mixed with each other in a water-based solution, and the Equation 2 is satisfied according to the Equation 1, such that at the time of heat-treatment, the lithium and the transition metal may have uniformity maintained even at the time of nucleation and growth of the desired lithium composite metal oxide, thereby manufacturing a cathode active material having excellent crystallinity and significant uniform composition, and easily inserting lithium ions thereinto and easily desorbing lithium ions therefrom.

The method for manufacturing a cathode active material according to an exemplary embodiment of the present invention may further include preparing the above-described precursor aqueous solution as a gel. The preparing of the precursor aqueous solution as a gel may be performed by reaction under a pressure of 100 mbar to 300 mar and at a temperature of 60 to 90° C. for 1 to 3 hours.

It does not matter that the cathode active material is manufactured by heat-treating the precursor aqueous solution itself satisfying the above-described Equations 1 and 2. However, the cathode active material may be manufactured by preparing an aqueous solution as a gel and then heat-treating the precursor gel. When using the precursor gel, an output of the cathode active material may be increased in a significantly short time.

As described above, at the time of heat-treating the precursor aqueous solution satisfying the Equations 1 and 2 or the precursor gel obtained by preparing the precursor aqueous solution satisfying the Equations 1 and 2 as a gel, significantly uniform composition thereof is maintained at the time of nucleation and growth of the cathode active material, thereby manufacturing the cathode active material having excellent crystallinity and uniform composition without forming a different phase.

In detail, the FTIR properties have a significant effect on crystallinity and uniformity of a cathode active material to be manufactured, and the precursor aqueous solution according to the present invention satisfies the Equation 2 above according to the Equation 1 above, such that a lithium composite metal oxide (cathode active material) having a hexagonal compact structure in which a lattice constant ratio (c/a) is 4.975 or more may be manufactured.

When the precursor aqueous solution does not satisfy the Equation 2 above, a lithium composite metal oxide in which the ratio of c/a is less than 4.975, is merely manufactured, and compositional uniformity of the lithium composite metal oxide particles to be manufactured may not be secured, and the undesired different phase may be formed.

That is, the method for manufacturing the cathode active material according to an exemplary embodiment of the present invention uses the precursor aqueous solution satisfying the Equations 1 and 2, such that compositional uniformity according to removal of water and/or organic materials is not deteriorated, thereby manufacturing a high qualified cathode active material having uniform composition and excellent crystallinity.

In the method for manufacturing the cathode active material according to an exemplary embodiment of the present invention, the heat-treatment for manufacturing the cathode active material may be performed at 200 to 1000° C. and under an atmosphere containing oxygen. In detail, the heat-treatment may be a multiple heat-treatment including a low temperature heat-treatment at 200 to 400° C. and a high temperature heat-treatment at 600 to 1000° C., wherein the low temperature heat-treatment may be performed for 1 to 4 hours and then the high temperature heat-treatment may be continuously and non-continuously performed for 15 to 25 hours. By the above-described multiple heat-treatment, crystallinity of the cathode active material, together with the precursor aqueous solution satisfying the Equations 1 and 2, may be improved.

In the method for manufacturing the cathode active material according to an exemplary embodiment of the present invention, the heat-treatment for manufacturing the cathode active material may be a spray pyrolysis process. The uniformity of the precursor aqueous solution (or the precursor gel) which is a heat-treatment target is obtained since the precursor aqueous solution contains an organic acid containing a carboxylic group so as to satisfy the above-described Equations 1 and 2, wherein the uniformity is stably maintained, such that the cathode active material may be manufactured by a spray pyrolysis process.

The spray pyrolysis process, which is a method in which production of droplet (droplet of the precursor aqueous solution), dryness, and nucleation and growth of the desired lithium composite metal oxide are performed in a significantly short time, is appropriate for mass-production of particles of a spherical shaped fine cathode active material (lithium composite metal oxide); however, has disadvantages in that the cathode active material to be manufactured has deteriorated crystallinity and excessively compositional non-uniformity.

However, according to an exemplary embodiment of the present invention, the precursor aqueous solution (or precursor gel) satisfying the above-described Equations 1 and is used, such that the cathode active material having excellent crystallinity and compositional uniformity may be manufactured while using a spray pyrolysis process which is appropriate for mass-production.

At the time of the spray pyrolysis process, the droplet may have an average size of 0.1 to 100 μm and may be pyrolyzed (heat-treated) at a temperature of 400 to 1000° C. The average size of the droplet is a size in which a spherical shaped lithium composite metal oxide (cathode active material) powder is capable of being obtained and excellent tab density may be obtained, and the pyrolysis temperature is a condition in that the lithium composite metal oxide is stably manufactured in a short-time, and densified lithium composite metal oxide particles are capable of being manufactured.

A transfer gas transferring the produced droplet to an ultrasonic vibrator or a nozzle contains oxygen, for example, oxygen or an inert gas containing air or oxygen, may be used.

The transfer gas may have a flow velocity of 1 to 500 L/min. The flow velocity of the transfer gas is a flow velocity at which the cathode active material having uniform composition and densified spherical particles is capable of being manufactured in a significantly short time of several to dozens of seconds in the pyrolysis (heat-treatment) process.

Optionally, the cathode active material particles obtained by the spray pyrolysis process may be subjected to a post-treatment which is a heat-treatment at a temperature of 600 to 1000° C. for 20 minutes to 20 hours. By the post-treatment, a cathode active material having significantly excellent crystallinity and uniform composition may be manufactured.

In the method for manufacturing the cathode active material according to an exemplary embodiment of the present invention, the lithium precursor contained in the precursor aqueous solution may be any lithium precursor as long as the lithium precursor is capable of being dissolved in water, and may substantially include nitrate, acetate, hydroxide, chloride, sulphate of lithium, or mixtures thereof.

In the method for manufacturing the cathode active material according to an exemplary embodiment of the present invention, the organic acid containing a carboxylic group contained in the precursor aqueous solution may be any organic acid as long as the organic acid is capable of being dissolved in water and contains a carboxylic group, and may include a malic acid, a citric acid, a succinic acid, an oxalic acid, tartrate, an acrylic acid, a humic acid, an ascorbic acid, or mixtures thereof.

In the method for manufacturing the cathode active material according to an exemplary embodiment of the present invention, the transition metal precursor contained in the precursor aqueous solution may include a precursor of one or two or more metals selected from a group consisting of nickel, cobalt, manganese, aluminum, magnesium, chromium, iron, zirconium, titanium, zinc, scandium, yttrium, niobium, molybdenum and ruthenium.

In the method for manufacturing the cathode active material according to an exemplary embodiment of the present invention, the transition metal precursor contained in the precursor aqueous solution may be any transition metal precursor as long as the transition metal precursor is capable of being dissolved in water, and may include nitrate, acetate, hydroxide, chloride, sulphate of the transition metal, or mixtures thereof, as being independently of the lithium precursor.

In the method for manufacturing the cathode active material according to an exemplary embodiment of the present invention, the precursor aqueous solution may contain the lithium precursor and the transition metal precursor so as to satisfy the following Equation 3 or 4:

$$Li_{1+x}Ni_\alpha Mn_\beta Co_\gamma M'_\delta O_2 \quad \text{(Equation 3)}$$

(in Equation 3 above, x is an actual number satisfying $-0.04 \leq x < 1$, $\alpha$, $\beta$, $\gamma$, and $\delta$ are actual numbers satisfying $\alpha+\beta+\gamma+\delta=1$ and $0 \leq \alpha < 1$, $0 \leq \beta < 1$, $0 \leq \gamma < 1$, and $0 \leq \delta < 1$, and M' is one or more metals selected from aluminum, magnesium, chromium, iron, zirconium, titanium, zinc, scandium, yttrium, niobium, molybdenum and ruthenium)

$$LiMn_{2-y}M''_y O_4 \quad \text{(Equation 4)}$$

(in Equation 4 above, y is an actual number satisfying $0 \leq y < 2$ and M" is one or more metals selected from nickel, cobalt, aluminum, magnesium, chromium, iron, zirconium, titanium, zinc, scandium, yttrium, niobium, molybdenum and ruthenium).

In the method for manufacturing the cathode active material according to an exemplary embodiment of the present invention, a molar concentration of lithium ions contained in the precursor aqueous solution may be 0.1M to 7.0M, and the precursor aqueous solution may contain a precursor of one or two or more metals selected from nickel, cobalt, manganese, aluminum, magnesium, chromium, iron, zirconium, titanium, zinc, scandium, yttrium, niobium, molybdenum and ruthenium, so as to satisfy a relative ratio of lithium ions according to the Equation 3 or 4, together with the lithium precursor satisfying the molar concentration of lithium ions.

In the method for manufacturing the cathode active material according to an exemplary embodiment of the present invention, by using the above-described precursor aqueous solution, the cathode active material in which the mass-production is possible at a low const and high crystallinity and high capacity are provided by a simple heat-treatment, may be manufactured, and the high qualified cathode active material may be manufactured by the spray pyrolysis method which is appropriate for mass-production.

The present invention contains a cathode active material for a lithium secondary battery. The cathode active material according to an exemplary embodiment of the present invention may be a lithium composite metal oxide satisfying the following Equation 3 or 4 and may be a lithium composite metal oxide having a hexagonal compact structure in which a lattice constant ratio (c/a) is 4.975 or more. By heat-treating the above-described precursor aqueous solution, the cathode active material according to an exemplary embodiment of the present invention may have a hexagonal compact structure in which a lattice constant ratio (c/a) is 4.975 or more, and thus, lithium ions may be easily inserted into the cathode active material or easily desorbed from the cathode active material.

$$Li_{1+x}Ni_\alpha Mn_\beta Co_\gamma M'_\delta O_2 \quad \text{(Equation 3)}$$

(in Equation 3 above, x is an actual number satisfying $-0.04 \leq x < 1$, $\alpha$, $\beta$, $\gamma$, and $\delta$ are actual numbers satisfying $\alpha+\beta+\gamma+\delta=1$ and $0 \leq \alpha < 1$, $0 \leq \beta < 1$, $0 \leq \gamma < 1$, and $0 \leq \delta < 1$, and M' is one or more metals selected from aluminum, magnesium, chromium, iron, zirconium, titanium, zinc, scandium, yttrium, niobium, molybdenum and ruthenium)

$$LiMn_{2-y}M''_y O_4 \quad \text{(Equation 4)}$$

(in Equation 4 above, y is an actual number satisfying $0 \leq y < 2$ and M" is one or more metals selected from nickel, cobalt, aluminum, magnesium, chromium, iron, zirconium, titanium, zinc, scandium, yttrium, niobium, molybdenum and ruthenium).

Hereinafter, the following Manufacturing Examples of the present invention will be described in detail. However, the Manufacturing Examples are described by way of examples only, and thus, it is not construed to limit the appended claims thereto.

Manufacturing Example 1

A precursor aqueous solution was prepared by dissolving lithium nitrate, nickel nitrate, manganese nitrate, and cobalt nitrate in a distilled water so as to satisfy composition of $LiNi_{0.33}Mn_{0.33}Co_{0.33}O_2$, and adding a citric acid thereto so as to satisfy C.I.=0.763 like the result of FTIR shown in 'Manufacturing Example 1' of FIG. 1 at the time of gelation. The gelation was performed by reacting the prepared precursor aqueous solution under a pressure of 153 mbar and at a temperature of 75° C. for 2 hours, by a vacuum evaporator. The FTIR measurement was conducted by Nicolet 6700 FTIR System and SMART Orbit ATR Accessory (ZnSe) supplied by Thermo Fisher Scientific company, under resolution measurement condition of 4 $cm^{-1}$ in 500-4000 $cm^{-1}$ region which is a Mid-IR region.

Manufacturing Example 2

A precursor aqueous solution was prepared by the same manner as the Manufacturing Example 1 above, except for adding a citric acid thereto so as to satisfy C.I.=0.640 like the result of FTIR of the precursor gel shown in 'Manufacturing Example 2' of FIG. 1 at the time of gelation which was the same as Manufacturing Example 1.

Comparative Example 1

A precursor aqueous solution was prepared by the same manner as the Manufacturing Example 1 above, except for adding a citric acid thereto so as to satisfy C.I.=0.451 like the result of FTIR of the precursor gel shown in 'Comparative Example 1' of FIG. 1 at the time of gelation which was the same as Manufacturing Example 1.

Comparative Example 2

A precursor aqueous solution was prepared by the same manner as the Manufacturing Example 1 above, except for not adding a citric acid thereto, and the measurement result of FTIR of the precursor gel obtained by the same gelation as the Manufacturing Example 1 was shown as 'Comparative Example 2' in FIG. 1.

Manufacturing Example 3

A cathode active material having a composition of $LiNi_{0.33}Mn_{0.33}Co_{0.33}O_2$ was manufactured by heat-treating the precursor gel prepared by the Manufacturing Example 1 above in the air at 300° C. for 2 hours, and heat-treating again at an atmosphere into which air of 2 L/min is injected, at 900° C. for 20 hours.

Manufacturing Example 4

A cathode active material was manufactured by the same manner as the Manufacturing Example 3 above, except for using the precursor gel manufactured by the Manufacturing Example 2 above.

Comparative Example 3

A cathode active material was manufactured by the same manner as the Manufacturing Example 3 above, except for using the precursor gel manufactured by the Comparative Example 1 above.

Comparative Example 4

A cathode active material was manufactured by the same manner as the Manufacturing Example 3 above, except for using the precursor gel manufactured by the Comparative Example 2 above.

Comparative Example 5

A cathode active material having a composition of $LiNi_{0.33}Mn_{0.33}Co_{0.33}O_2$ was manufactured by a coprecipitation method.

Manufacturing Example 5

Cathode was manufactured by coating a slurry containing the cathode active material manufactured by the Manufacturing Example 3 above onto a current collector made of an aluminum foil, followed by drying and rolling processes, so as to have a density of 1.9 to 2.1 $g/cm^2$, and the manufactured cathode (12Φ), separator (16.4Φ), lithium metal anode (16.2Φ) were stacked to each other, thereby manufacturing a unit cell.

Manufacturing Example 6

A unit cell was manufactured by the same manner as the Manufacturing Example 5 above, except for using the cathode active material manufactured by the Manufacturing Example 4 above.

Comparative Example 6

A unit cell was manufactured by the same manner as the Manufacturing Example 5 above, except for using the cathode active material manufactured by the Comparative Example 3 above.

Comparative Example 7

A unit cell was manufactured by the same manner as the Manufacturing Example 5 above, except for using the cathode active material manufactured by the Comparative Example 4 above.

Comparative Example 8

A unit cell was manufactured by the same manner as the Manufacturing Example 5 above, except for using the cathode active material manufactured by the Comparative Example 5 above.

FIG. 2 shows a result obtained by measuring lattice constants (a and c) of the cathode active materials manufactured by the Manufacturing Examples 3 and 4, and Comparative Examples 3 and 4. It was confirmed from FIG. 2 that when manufacturing the cathode active material using the precursor aqueous solution according to the present invention, the cathode active material having a hexagonal compact structure in which a lattice constant ratio (c/a) is 4.975 or more was manufactured.

FIG. 3 shows a result obtained by measuring electric properties of the unit cells manufactured by the Manufacturing Examples 5 and 6, and Comparative Examples 6, 7, and 8, which is obtained under conditions including charging up to 4.3V with a ratio of 0.1C while assuming that a reversible capacity is 180 mAh/g, and the discharging up to 3V with the same ratio. It could be appreciated from FIG. 3 that when manufacturing the cathode active material using the precursor aqueous solution according to the present invention, an initial discharge capacity of 168 mAh/g and 167 mAh/g was obtained, and excellent performance was provided.

FIG. 4 shows battery capacity and the c/a ratio of the cathode active material, of the Manufacturing Examples 5 and 6 and Comparative Examples 6 and 7, and it could be appreciated from FIG. 4 that as the cathode active material manufactured by the precursor aqueous solution according to the present invention has high c/a ratio, the discharge capacity was also high.

The invention claimed is:

1. A method for manufacturing a cathode active material for a lithium secondary battery, comprising:

gelling a precursor aqueous solution containing a lithium precursor, a transition metal precursor, and an organic acid containing a carboxyl group to prepare a precursor gel having Fourier transform infrared (FTIR) spectroscopy spectrum satisfying the following Equation 2 by the definition of the following Equation 1, and heat-treating the precursor gel:

$$\text{Chelation Index (C.I.)} = \frac{100 - \% \text{ Transmittance}(1550)}{(100 - \% \text{ Transmittance}(1550)) + (100 - \% \text{ transmittance}(1700))} \quad \text{(Equation 1)}$$

$$0.640 \leq \text{C.I.} \leq 0.763 \quad \text{(Equation 2)}$$

wherein in Equation 1 above, % Transmittance (1700) means transmittance of a peak located at a wavenumber from 1,700 to 1,710 cm$^{-1}$ in FTIR spectrum of the precursor gel and % Transmittance (1550) means transmittance of a peak located at a wavenumber from 1,550 to 1,610 cm$^{-1}$ in the same FTIR spectrum, wherein gelling the precursor aqueous solution is performed at 60 to 90° C. under a pressure of 100 mbar to 300 mbar.

2. The method of claim 1, wherein the transition metal precursor is a precursor of one or two or more metals selected from a group consisting of nickel, cobalt, manganese, aluminum, magnesium, chromium, iron, zirconium, titanium, zinc, scandium, yttrium, niobium, molybdenum and ruthenium.

3. The method of claim 1, wherein the lithium precursor and the transition metal precursor are each independently nitrates, acetates, hydroxides, chlorides, sulfur oxides, or mixtures thereof.

4. The method of claim 1, wherein the precursor aqueous solution contains the lithium precursor and the transition metal precursor so as to satisfy the following Equation 3 or 4:

$$\text{Li}_{1+x}\text{Ni}_\alpha\text{Mn}_\beta\text{Co}_\gamma\text{M'}_\delta\text{O}_2 \quad \text{(Equation 3)}$$

$$\text{LiMn}_{2-y}\text{M''}_y\text{O}_4 \quad \text{(Equation 4)}$$

wherein in Equation 3 above, x is an actual number satisfying $-0.04 \leq x < 1$, $\alpha$, $\beta$, $\gamma$, and $\delta$ are actual numbers satisfying $\alpha+\beta+\gamma+\delta=1$ and $0 \leq \alpha < 1$, $0 \leq \beta < 1$, $0 \leq \gamma < 1$, and $0 \leq \delta < 1$, and M' is one or more metals selected from aluminum, magnesium, chromium, iron, zirconium, titanium, zinc, scandium, yttrium, niobium, molybdenum and ruthenium, and wherein in Equation 4 above, y is an actual number satisfying $0 \leq y < 2$ and M'' is one or more metals selected from nickel, cobalt, aluminum, magnesium, chromium, iron, zirconium, titanium, zinc, scandium, yttrium, niobium, molybdenum and ruthenium.

5. The method of claim 4, wherein the precursor aqueous solution has a molar concentration of lithium ions of 0.1M to 7.0M.

6. The method of claim 1, wherein the heat-treating is performed at 200 to 1000° C.

7. The method of claim 6, wherein the heat-treating is a spray pyrolysis process.

8. The method of claim 2, wherein the heat-treating is performed at 200 to 1000° C.

9. The method of claim 3, wherein the heat-treating is performed at 200 to 1000° C.

10. The method of claim 4, wherein the heat-treating is performed at 200 to 1000° C.

11. The method of claim 5, wherein the heat-treating is performed at 200 to 1000° C.

* * * * *

UNITED STATES PATENT AND TRADEMARK OFFICE
CERTIFICATE OF CORRECTION

PATENT NO. : 9,932,242 B2  
APPLICATION NO. : 14/362877  
DATED : April 3, 2018  
INVENTOR(S) : Jung In Yeon et al.

Page 1 of 1

It is certified that error appears in the above-identified patent and that said Letters Patent is hereby corrected as shown below:

Column 1, Line 9, delete "PCT/KR2012/01054" and insert -- PCT/KR2012/010544 --

Column 11, Lines 32-34, Claim 1, delete "
$$Chelation\ Index\ (C.I.) = \frac{100 - \%\ Transmittance(1550)}{(100 - \%\ Transmittance(1550) + (100 - \%\ transmittance(1700)}$$
"

and insert --
$$Chelation\ Index\ (C.I.) = \frac{100 - \%\ Transmittance\ (1550)}{100 - \%\ Transmittance\ (1550) + 100 - \%\ Transmittance\ (1700)}$$
--

Signed and Sealed this  
Third Day of July, 2018

Andrei Iancu  
*Director of the United States Patent and Trademark Office*